(12) United States Patent
Sasaki

(10) Patent No.: US 8,208,096 B2
(45) Date of Patent: Jun. 26, 2012

(54) LIQUID CRYSTAL DISPLAY DEVICE

(75) Inventor: Hiroshi Sasaki, Mito (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 479 days.

(21) Appl. No.: 12/539,657

(22) Filed: Aug. 12, 2009

(65) Prior Publication Data

US 2010/0053499 A1    Mar. 4, 2010

(30) Foreign Application Priority Data

Sep. 4, 2008    (JP) ................... 2008-226656

(51) Int. Cl.
*G02F 1/1335* (2006.01)
*G02F 1/1333* (2006.01)

(52) U.S. Cl. .............. 349/96; 349/62; 349/60; 349/137

(58) Field of Classification Search ............ 349/96, 349/62, 60, 137
See application file for complete search history.

(56) References Cited

U.S. PATENT DOCUMENTS

| 7,072,008 | B2 * | 7/2006 | Iijima ........................... 349/96 |
| 7,804,558 | B2 * | 9/2010 | Sasaki et al. .................. 349/96 |
| 2007/0002211 | A1 | 1/2007 | Sasaki et al. | |
| 2007/0046874 | A1 * | 3/2007 | Adachi et al. .............. 349/122 |
| 2008/0211984 | A1 | 9/2008 | Sugibayashi et al. | |
| 2008/0297685 | A1 | 12/2008 | Sugibayashi et al. | |

FOREIGN PATENT DOCUMENTS

| JP | 05-165011 | 6/1993 |
| JP | 06-075210 | 3/1994 |
| JP | 07-064066 | 3/1995 |
| JP | 09-318932 | 12/1997 |
| JP | 11-174417 | 7/1999 |

* cited by examiner

*Primary Examiner* — Mike Qi
(74) *Attorney, Agent, or Firm* — Antonelli, Terry, Stout & Kraus, LLP.

(57) ABSTRACT

A liquid crystal display device has a liquid crystal display module including a backlight unit and a liquid crystal panel; a first polarizing plate attached to a side of the liquid crystal panel, the side facing the backlight unit; a transparent front plate mounted on a side of the liquid crystal panel, the side not facing the backlight unit; a transparent organic medium layer placed between the front plate and the liquid crystal panel; and a second polarizing plate attached to a surface of the front plate, the surface opposite from a surface thereof closer to the transparent organic medium layer. An end section of the second polarizing plate is sealed using resin so as not to be directly exposed to air.

17 Claims, 5 Drawing Sheets

LIQUID CRYSTAL DISPLAY DEVICE

CROSS-REFERENCE TO RELATED APPLICATION

The present application claims priority from Japanese application JP2008-226656 filed on Sep. 4, 2008, the content of which is hereby incorporated by reference into this application.

BACKGROUND OF THE INVENTION

1. Field of the Invention

The present invention relates to a liquid crystal display device, and specifically to a liquid crystal display device having a transparent front plate attached to an image display surface.

2. Description of the Related Art

In a liquid crystal display device using liquid crystal, light from a light source is recognized as an image after having passed through a liquid crystal layer, a color filter, a polarizing plate, and so forth.

In the above, a polarizing plate is used for the forefront surface of a liquid crystal display device used for a monitor of a personal computer or a liquid crystal television, and an anti-glare (AG) film having fine concaves and convexes formed thereon or a reflection preventing film is attached to the surface of the polarizing plate in order to suppress reflection on the surface. Some liquid crystal panels employ a glass plate having thickness of approximately 0.5 to 0.7 mm mounted under the polarizing plate.

A liquid crystal display device used in a portable phone is constantly placed under a state of being rubbed as the portable phone is often carried in a pocket of clothes. As such a use is expected, an image display surface has a structure in which a transparent substrate, such as acrylic resin, or the like, is attached to the polarizing plate so that the clothes, or the like, do not directly touch the image display surface.

As the thickness of the glass plate under the polarizing plate of a personal computer monitor or a liquid crystal television is of approximately 0.5 to 0.7 mm, as above-described, the glass plate may possibly be broken when being bumped by a dish, a vase, a toy, or the like, with significant impact.

In the trend of enlarging the size of the screen of a personal computer monitor and a liquid crystal television, there is an increasing possibility of breaking the glass plate even with very small impact as shockproof performance of the glass plate will decrease as the screen size becomes larger while the glass plate thickness remains unchanged.

To address the above, there is proposed a method for improving shockproof performance by providing a transparent substrate (hereinafter referred to as a front plate) to the forefront surface, similar to a portable phone.

However, as there is a gap between the front plate and the polarizing plate, significant reflection of ambient scenery on the image display surface is caused due to reflection by three surfaces, namely, the front and back surfaces of the front plate and the surface of the polarizing plate. This results in deterioration of visibility in a bright place.

To address the above, Patent Documents mentioned below disclose a method for suppressing reflection by the polarizing plate and that by the front plate on the polarizing plate side by filling transparent organic medium in the gap between the front plate and the polarizing plate.

Patent Document 1: Japanese Patent Laid-open Publication No. 11-174417

Patent Document 2: Japanese Patent Laid-open Publication No. 6-75210

Patent Document 3: Japanese Patent Laid-open Publication No. 9-318932

Patent Document 4: Japanese Patent Laid-open Publication No. 5-165011

Patent Document 5: Japanese Patent Laid-open Publication No. 7-64066

Here, when the front plate is made of glass, the front plate needs a protection film attached thereto in order to prevent the glass from being scattered should the glass be broken due to impact. In addition, provision of an anti-glare layer or an anti-reflecting layer on the film is desired in order to prevent deterioration of visibility of an image due to reflection of ambient scenery.

The protection film, however, produces a waste of a separate film for protecting the adhesive layer, which resultantly places a burden on the environment.

Moreover, as a transparent organic medium layer, a front plate, and a protection film are provided in addition to a conventional liquid crystal panel, visibility may be deteriorated unless these layers are attached without causing bubbles. This leads to decrease of yield, and thus increase of the ratio of a liquid crystal panel to be disposed of. This resultantly places a further burden on the environment.

Moreover, even if the layers can be attached without causing bubbles, an increase of the number of interfaces results in accumulated reflections though reflection on each interface is small, which results in a darker screen image when the same backlight is used.

To address the problem, it is necessary to increase the amount of light emitting from the backlight. This leads to increase of power consumption, which again places a further burden on the environment.

SUMMARY OF THE INVENTION

The present invention aims to provide a liquid crystal display device having a structure including a simplified layer structure, which makes good use of a merit obtained by providing a front plate and places little burden on the environment.

After studying various structures, the present inventor has found that it is possible to reduce a burden to be placed on the environment by attaching a polarizing plate (hereinafter referred to as an image display surface-side polarizing plate), conventionally attached to the liquid crystal panel on the transparent organic medium layer side, to the front plate, instead.

In addition, the present inventor has successfully conceived a structure for protecting an end section of the polarizing plate to address a problem that polyvinyl alcohol and iodine doped inside the polarizing plate starts to be eluted and the function as the polarizing plate can no longer be provided when the end section of the polarizing plate is wet with water from a wet cloth, or the like, used in wiping the screen image.

In order to address the above described problems, according to one aspect of the present invention, there is provided a liquid crystal display device including a power source, an amplification device, a backlight unit, and a liquid crystal panel held by two glass substrates and including between thereof an electrode, a liquid crystal layer, an alignment layer, and a color filter, wherein a polarizing plate is attached to a side of the liquid crystal panel, the side facing the backlight unit; a transparent front plate is mounted on a side of the liquid crystal panel, the side not facing the backlight unit; a transparent organic medium layer is placed between the front plate and the liquid crystal panel; another polarizing plate is attached to a surface of the front plate, the surface not in direct contact with the transparent organic medium layer; and an end section of the polarizing plate is sealed using resin so as not to be directly exposed to air.

Further, in order to solve the above described problems, in the above described liquid crystal display device, the end section of the polarizing plate attached to the front plate may be folded into inside the liquid crystal module along a surface of the front plate.

Still further, in order to solve the above described problems, according to another aspect of the present invention, there is provided a liquid crystal display device including a power source, an amplification device, a backlight unit, and a liquid crystal panel held by two glass substrates and including between thereof an electrode, a liquid crystal layer, an alignment layer, and a color filter, wherein a polarizing plate is attached to a side of the liquid crystal panel, the side facing the backlight unit; a transparent front plate is mounted on a side of the liquid crystal panel, the side not facing the backlight unit; a transparent organic medium layer is placed between the front plate and the liquid crystal panel; another polarizing plate is attached to a surface of the front plate, the surface not in direct contact with the transparent organic medium layer; and an end section of the polarizing plate attached to the front plate is inserted from an end section of the front plate into inside the liquid crystal display device.

Further, in order to solve the above described problems, in the above described liquid crystal display device, the end section of the polarizing plate attached to the front plate may be folded into inside the liquid crystal module along a lateral surface of the front plate, and a portion of the polarizing plate attached to the front plate, the portion being along the lateral surface of the front plate, and an enclosure of the liquid crystal module may be sealed and bound, using common resin.

According to the present invention, one of the polarizing plates (an image display surface-side polarizing plate), which has conventionally been attached to the liquid crystal panel, is attached to the front plate. With the above, a protection film is no longer necessary to be attached to the front plate. This can reduce a waste, a member required, and power consumption, and therefore can advantageously reduce a burden to be placed on the environment.

DETAILED DESCRIPTION OF THE INVENTION

In the following, embodiments of the present invention will be described in detail referring to the accompanying drawings.

Note that a transparent organic medium used in the present invention is defined as a resin sheet or resin formed by dropping liquid precursor of the transparent organic medium onto a liquid crystal panel and then curing the dropped precursor by means of external stimulation, such as light, heat, humidity, or the like, after a front plate is placed so as to contact the liquid crystal panel via the transparent organic medium.

Specifically, methylmethacrylate, ethylmethacrylate, propylmethacrylate, iso-propylmethacrylate, buthylmethacrylate, iso-buthylmethacrylate, hexylmethacrylate, octylmethacrylate, 2-ethylhexcylmethacrylate, decylmethacrylate, dodecylmethacrylate, methylacrylate, ethylacrylate, propylacrylate, iso-propylacrylate, buthylacrylate, iso-buthylacrylate, hexcylacrylate, octylacrylate, 2-ethylhexcylacrylate, decylacrylate, dodecylacrylate, or the like, which contains hardener added thereto for promoting hardening by means of heat, or the like, can be used. The transparent organic medium layer is formed through single or combination use of a plurality of kinds of the above described materials. Further, the transparent organic medium layer can be formed also through copolymerization of the above described materials with other prepolymer or monomer. In the above, prepolymer for use may include polyacrylic acid, polyvinyl alcohol, polyallylamine, and so forth, and monomer for use may include ethyleneglycol, propyleneglycol, diethyleneglycol, 1,3-dihydroxycyclobutane, 1,4-dihydroxycyclohexane, 1,5-dihydroxycyclooctane, or the like, having hydroxyl in molecule, or ethyleneglycol monoglycidyl ether, ethyleneglycol diglycidyl ether, or the like, having glycidyl group at the end.

Summary of Embodiments

In the following, one of the embodiments is outlined, referring to FIGS. 1 and 2.

Figure 1:
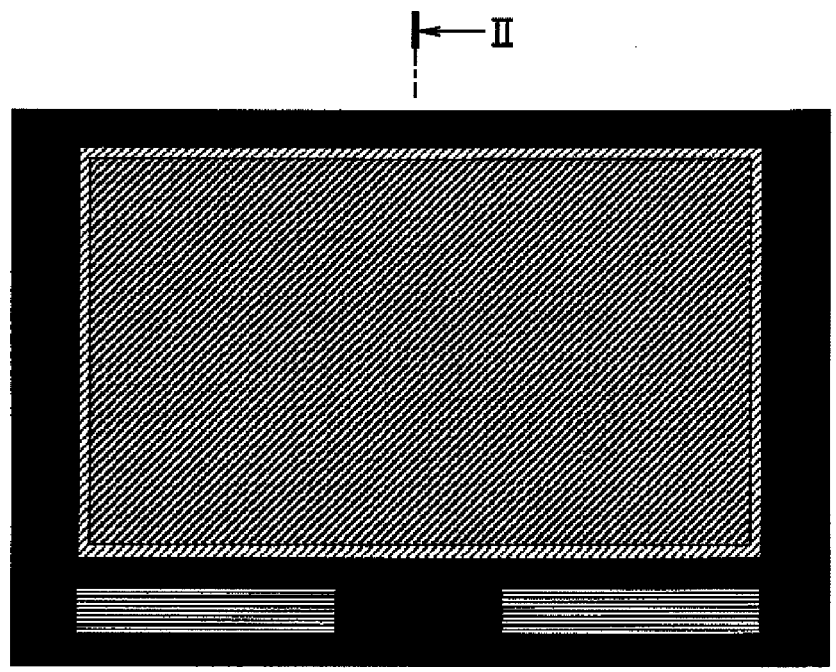
FIG. 1 is a schematic view showing an image display surface of a liquid crystal display device according to the present invention.
Figure 1:
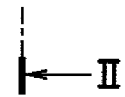

FIG. 1 is a schematic diagram showing a liquid crystal display device according to the present invention. FIG. 2 is a schematic cross sectional view of the liquid crystal display device shown in FIG. 1 (the cross section of the liquid crystal display device shown in FIG. 1 along the line II-II).

In FIG. 1, the liquid crystal panel 1 comprises a pair of front-side and back-side transparent glass panels (not shown) having between thereof a liquid crystal layer, an electrode structure for applying an electric field to the liquid crystal layer, various insulating films, an alignment layer, and a color filter for imparting to a pixel a color in accordance with the darkness and brightness of the liquid crystal layer.

The back-side glass panel has a backlight-side polarizing plate 2 attached thereto for passing light in one direction.

Supposing that the image display surface side of the liquid crystal panel 1 is defined as the front surface, while the side thereof closer to the backlight is defined as the back surface, optical members, such as, a diffusing sheet 3, a prism sheet 4, a diffusing plate 5, and so forth, are provided on the back surface side of the liquid crystal panel 1 with the backlight-side polarizing plate 2 in-between, that is, behind the backlight-side polarizing plate 2.

Figure 2:
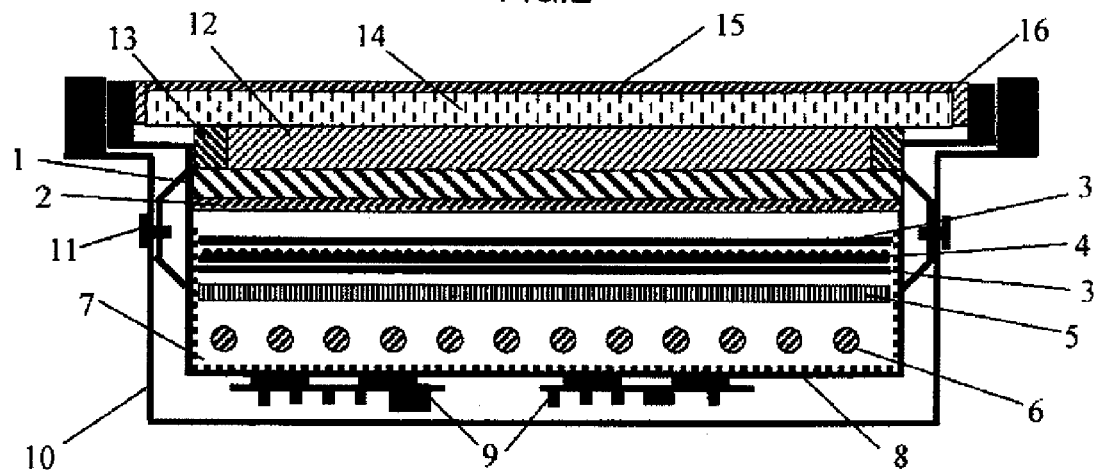
FIG. 2 is a schematic cross sectional view of the liquid crystal display device shown in FIG. 1.

Although an example including two diffusing sheets provided is shown in FIG. 2, only a single diffusing sheet may be provided instead.

Further, a light source is provided behind the optical members.

In FIG. 2, the light source is a fluorescent lamp 6, though a light emitting diode, or the like, may be used instead as a light source.

Further, although a plurality of light sources are provided so as to traverse behind the liquid crystal panel 1, the light source may be provided to the respective ends or one end of the liquid crystal panel 1 such that light irradiates the entire panel 1 via a light guiding panel.

Light from the light source is efficiently irradiated toward the liquid crystal panel 1 by the reflecting layer 7.

The reflecting layer 7 comprises a resin sheet containing white material, such as, magnesium oxide, or the like, or a sheet coated by a film containing white material, or the like.

A substrate 9 having a power source, a tuner, an amplifier, or the like, mounted thereon is attached to the enclosure 8 of the liquid crystal module, though these components may be mounted on the enclosure 10 of the liquid crystal display device.

In FIG. 2, the liquid crystal module is secured to the enclosure 10 of the liquid crystal display device by securing the enclosure 8 of the liquid crystal module to the enclosure 10 of the liquid crystal display device, using clasps 11, though the manner of securing is not particularly limited. The securing may be achieved through adhesion.

A transparent organic medium layer 12 is provided on the front surface side of the liquid crystal panel 1. In FIG. 2, showing this embodiment, a frame 13 is provided to an end section of the transparent organic medium layer 12.

The end section (four sides) of the liquid crystal panel 1 constitutes an area not showing an image (a non-display area (not shown)). Therefore, preferably, the frame 13 is mounted on the non-display area of the liquid crystal panel 1 so as not to hinder visibility of an image displayed.

Further, when the frame 13 is colorless transparent or black, the frame 13 appears similar in color to that (substantially black) of the polarizing plate. This is preferable as the frame 13 does not appear standing out. The front plate 14 and the image display surface-side polarizing plate 15 are placed on the frame 13.

Here, when a difference of double refraction of the members between the two polarizing plates 2, 15 is large, there is a risk that light of different phases may leak from the polarizing plate 15. With light leakage, brightness when displaying black becomes larger, which results in whitish black displayed.

Therefore, materials with small difference of double refraction are desired for the transparent organic medium layer 12.

Further, use of highly elastic material for the transparent organic medium layer 12 can improve buffer capacity against impact.

The range of elasticity of the transparent organic medium layer 12 is preferably from hardness 0 to 30 measured on a durometer of type A according to the rubber hardness measurement standard JISK6253.

The range of elasticity of the transparent organic medium layer 12 from hardness 10 to 30 is more preferred. Elasticity of the transparent organic medium layer 12 in excess of hardness 30 tends to reduce buffer effect against impact.

Note that the frame 13 is necessary when the transparent organic medium layer 12 is formed using liquid precursor of transparent organic medium, but not necessary when the transparent organic medium layer 12 is a resin sheet.

The front plate 14 is desired to be made of glass as glass has small retardation. When resin is used, a casting method is desirably used as a formation method as a front plate 14 formed using an extrusion or roll method or the like is likely to have large double refraction as stress tends to be applied to a molecular chain.

Further, as a difference of double refraction tends to increase when the front plate 14 becomes thicker, though retardation is small, the front plate 14 is desired to be formed so as to have the bare minimum thickness. As resin for a front plate, acrylic resin, polycarbonate resin, polyethylene terephthalate resin, cycloolefin resin, and so forth, may be used The majority difference of double refraction of the members between the two polarizing plates 2, 15 is attributed to the front plate 14 and the transparent organic medium layer 12 in consideration of thickness. Thus, materials having the smallest possible difference of double refraction are desired to be selected for these components.

With a total difference of double refraction of these members up to about 10 mm, an increase of brightness when displaying black is of 5% or less, with no practicable problem caused thereby.

When an anti-glare layer or an anti-reflecting layer is provided on the surface of the image display surface-side polarizing plate 15, reflection of ambient scenery on the surface in a bright room is reduced, which improves visibility.

First Embodiment

In the following, a first preferred embodiment for rendering the present invention into practice will be described in detail, referring to FIG. 2.

In FIG. 2, the polarizing plate 15 incorporates a polyvinyl alcohol layer with iodine doped therein. This component is drawn in one direction through drawing so that the iodine in the polyvinyl alcohol is aligned in one direction.

The iodine aligned in one direction provides a function for emitting only component in one direction in the incoming light. Also, the forefront surface of the polarizing plate 15 is processed for some extent of waterproof capacity so that the polyvinyl alcohol and iodine in the polarizing plate 15 are prevented from being wet by water when the polarizing plate 15 is wiped with a wet cloth, or the like.

However, as the polyvinyl alcohol layer having iodine doped therein remains uncovered in the end section of the polarizing plate 15, the end section of the polarizing plate 15 is not waterproof. Thus, with water soaking, the water-soluble polyvinyl alcohol and the iodine inside the polarizing plate 15 start to be eluted, as a result of which the function as a polarizing plate can no longer be provided.

Even though not being eluted, the polyvinyl alcohol may be changed as being swelled or the like, which disturbs the iodine alignment, and the function as a polarizing plate can thus no longer be provided.

In view of the above, in a liquid crystal display device according to the present invention, the end section of the image display surface-side polarizing plate 15 is sealed using sealing resin 16 to be waterproof.

This can advantageously prevent deterioration in performance of the image display surface-side polarizing plate 15 when the polarizing plate 15 is wiped with a wet cloth.

Basically, any resin which is not water-soluble can be used in the above, though soft and flexible resin with rubber hardness of about 0 to 30 is preferably used for sealing as being readily fit to the shape of the end section.

Even if the linear expansivity is large, use of the bare minimum amount can prevent exertion of stress to the liquid crystal panel, or the like.

Note that although the front plate 14 is shown larger than the liquid crystal panel 1 in FIG. 2, the front plate 14 may have the size same as that of the liquid crystal panel 1.

Second Embodiment

In the following, a second preferred embodiment for rendering the present invention into practice will be described in detail, referring to FIGS. 3, 4, and 5.

Figure 3:
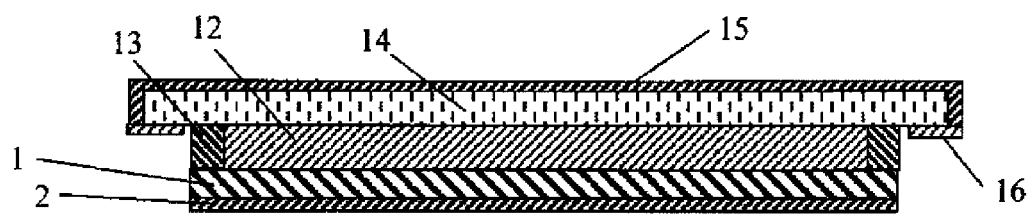
FIG. 3 is a schematic cross sectional view of a liquid crystal panel for use in a liquid crystal display device according to a second embodiment.

FIG. 3 is a schematic cross sectional view of the liquid crystal panel 1 for use in a liquid crystal display device according to the second embodiment.

Figure 4:
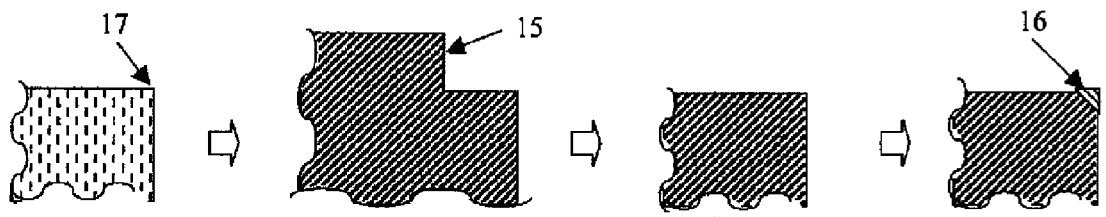
FIG. 4 is a diagram explaining sealing of an end section of a front plate of an image display surface-side polarizing plate.

FIG. 4 is a diagram explaining sealing of an end section of the front plate 14 of the image display surface-side polarizing plate 15.

Figure 5:
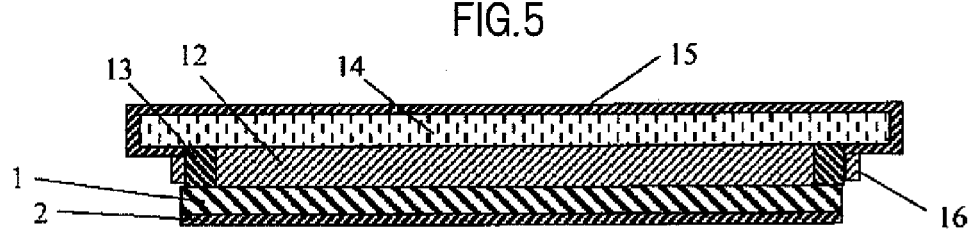
FIG. 5 is a schematic cross sectional view of a liquid crystal panel for use in a liquid crystal display device according to the second embodiment.

FIG. 5 is a schematic cross sectional view of the liquid crystal panel 1 for use in a liquid crystal display device according to the second embodiment.

When an image display surface-side polarizing plate 15 is attached to the front plate 14, the polarizing plate 15 is sealed on the lateral surface of the front plate 14 in FIG. 2. In this case, if the sealing resin is resulted flat along the surface of the front plate 14, the polarizing plate 15 can be wiped with a wet cloth, or the like, without catching the cloth, and dirt thereon can be smoothly removed.

However, the sealing portion is resulted rough to form an uneven surface, the cloth may be caught, and the sealing resin may be thereby removed.

To address the above, in FIG. 3, the image display surface-side polarizing plate 15 is bent along the lateral surface of the front plate 14 so that the end section thereof is sealed on the rear surface of the image display surface of the front plate 14.

Absence of the end section of the image display surface-side polarizing plate 15 on the front plate 14 can advantageously avoid a problem that a wet cloth wiping the polarizing plate 15 is caught or the sealing resin is removed.

Note that although the front plate 14 is shown larger than the liquid crystal panel 1 in FIG. 3, the front plate 14 may have the size same as that of the liquid crystal panel 1.

Note that when bending the image display surface-side polarizing plate 15, a portion thereof to contact an end section 17 of the front plate 14 is sealed using resin, as shown in FIG. 4, as not being able to be folded in.

Also, by folding into the rear surface of the image display surface of the front plate 14, as shown in FIG. 5, sealing effect can be further enhanced.

Third Embodiment

In the following, a third preferable embodiment for rendering the present invention into practice will be described in detail, referring to FIG. 6.

Figure 6:
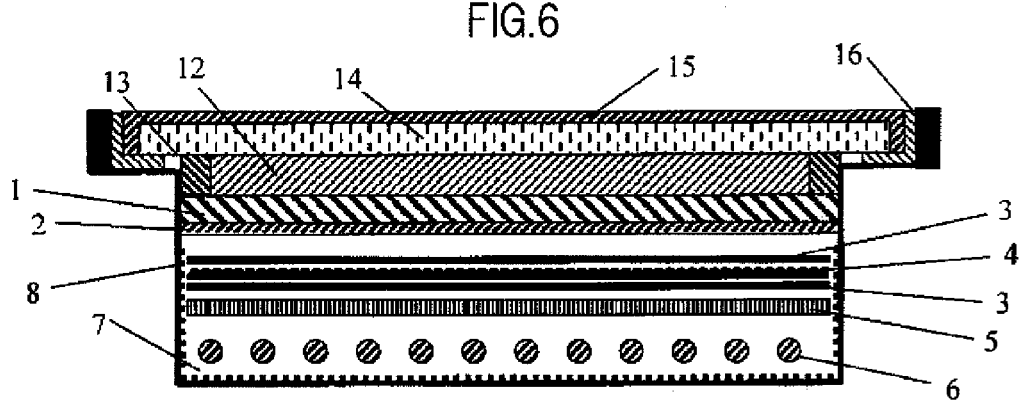
FIG. 6 is a schematic cross sectional view of a liquid crystal panel for use in a respective liquid crystal display device according to third and fourth embodiments.

FIG. 6 is a schematic cross sectional view of a liquid crystal panel 1 for use in a liquid crystal display device according to the third embodiment.

As shown in FIG. 6, the end section of the image display surface-side polarizing plate 15 is folded into between the lateral surface of the front plate 14 and the liquid crystal module, and the polarizing plate 15, the front plate 14, and the liquid crystal module are bound together, using sealing resin, when sealing. With the above, not only sealing of the end section of the polarizing plate 15, but also binding between the liquid crystal panel 1 having the front plate 14 attached thereon and the liquid crystal module can be achieved at the same time. This can enhance productivity.

Fourth Embodiment

In the following, a fourth preferred embodiment for rendering the present invention into practice will be described in detail, referring to FIG. 6.

FIG. 6 is a schematic cross sectional view of a liquid crystal panel 1 for use in a liquid crystal display device according to the third embodiment, and also that of a liquid crystal panel 1 for use in a liquid crystal display device according to the fourth embodiment.

In FIG. 6, when considering the image display surface of the front plate 14 as two separate areas, namely, a display area and a non-display area outside the display area, the display area remains black when the backlight does not light. Thus, basically, the non-display area remains black as well.

When the sealing resin portion is black, the sealing resin portion appears like an extension of the non-display area. This enhances apparent flatness of the entire image display surface, and is preferable in view of design.

Note that although the front plate 14 is shown larger than the liquid crystal panel 1 in FIG. 6, the front plate 14 may have the size same as that of the liquid crystal panel 1.

Fifth Embodiment

In the following, a fifth preferred embodiment for rendering the present invention into practice will be described in detail, referring to FIG. 7.

Figure 7:
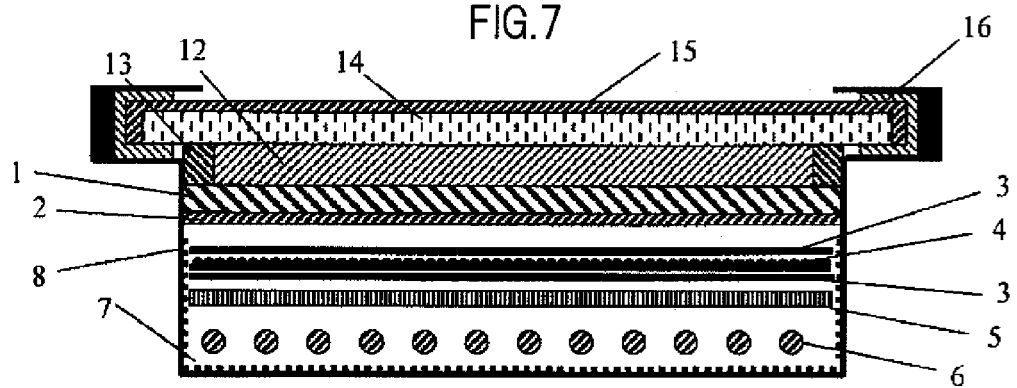
FIG. 7 is a schematic cross sectional view of a liquid crystal panel for use in a liquid crystal display device according to a fifth embodiment.

FIG. 7 is a schematic cross sectional view of a liquid crystal panel 1 for use in a liquid crystal display device according to the fifth embodiment.

With a structure, as shown in FIG. 7, in which a part of the liquid crystal module overlies the front plate 14 and sealing resin is filled in the gap in the area overlain, adhesion between the liquid crystal panel having the front plate 14 attached thereon and the liquid crystal module is enhanced.

Also, by binding the polarizing plate 15, front plate 14, and liquid crystal module together, using sealing resin, when sealing, as shown in FIG. 7, not only sealing of the end section of the polarizing plate 15, but also binding between the liquid crystal panel 1 having the front plate 14 attached thereon and the liquid crystal module can be achieved at the same time. This can enhance productivity.

Sixth Embodiment

In the following, a sixth preferred embodiment for rendering the present invention into practice will be described in detail, referring to FIG. 7, similar to the fifth embodiment.

Light from the backlight is recognized as an image after passing through the liquid crystal panel 1 and then the image display surface-side polarizing plate 15.

In the above, when light from the liquid crystal panel 1 passes through the transparent organic medium layer 12 and reaches the front plate 14, a part of the light proceeds toward the end section of the front plate 14, and a part thereof escapes to the outside from the end section of the front plate 14.

As the escaped light then meets the light in an end section of an image, the contour of the image becomes slightly blur. To address the above, the sealing resin is colored black to absorb the light escaped from the front plate 14 to thereby advantageously suppress blurring of the image contour.

Note that although the front plate 14 is shown larger than the liquid crystal panel 1 in FIG. 7, the front plate 14 may have the size same as that of the liquid crystal panel 1.

Seventh Embodiment

In the following, a sixth preferred embodiment for rendering the present invention into practice will be described in detail, referring to FIG. 8.

Figure 8:
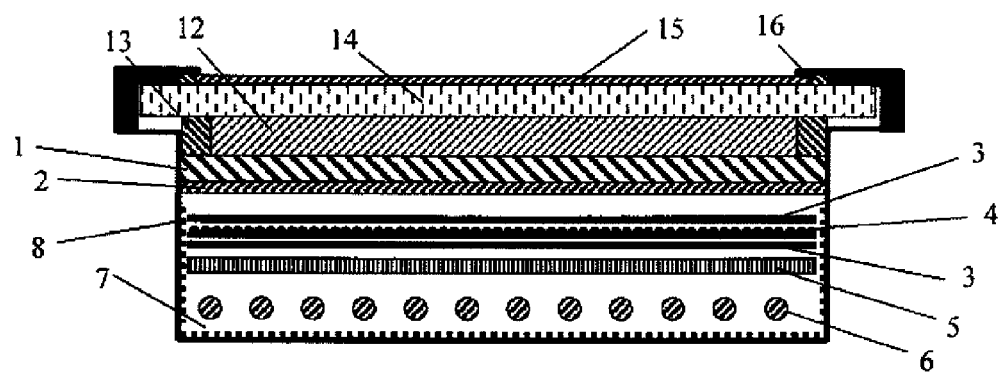
FIG. 8 is a schematic cross sectional view of a liquid crystal panel for use in a liquid crystal display device according to a seventh embodiment.

FIG. 8 is a schematic cross sectional view of a liquid crystal panel 1 for use in a liquid crystal display device according to the seventh embodiment.

Similar to FIG. 7, with a structure in which a part of the liquid crystal module overlies the front plate 14, adhesion between the liquid crystal panel 1 having the front plate 14 attached thereon and the liquid crystal module is enhanced.

Further, even though the image display surface-side polarizing plate 15 is smaller than the front plate 14, the degree of sealing in the end section of the image display surface-side polarizing plate 15 can be advantageously further enhanced when the end section is bound together with the liquid crystal module and the front plate 14, using sealing resin.

Note that although the front plate 14 is shown larger than the liquid crystal panel 1 in the diagram, the front plate 14 may have the size same as that of the liquid crystal panel 1.

Eighth Embodiment

In the following, an eighth preferred embodiment for rendering the present invention into practice will be described in detail, referring to FIG. 9.

Figure 9:
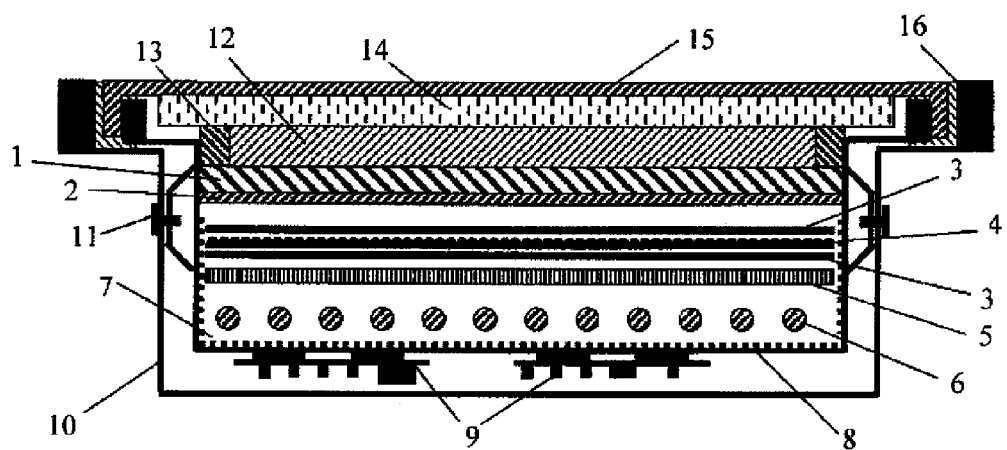
FIG. 9 is a schematic cross sectional view of a liquid crystal display device according to an eighth embodiment.

FIG. 9 is a schematic cross sectional view of a liquid crystal display device according to the eighth embodiment.

For wiping the image screen with a wet cloth, or the like, not only the display area of the image display surface but also the non-display area is desired to be flat so that the image screen can be wiped smoothly without catching the wet cloth, and dirt on the image screen can be readily removed. If there is a step between the end section of the front plate 14 and the module and between the end section of the module and the image display device, the wet cloth may be caught by the step and dirt may be piled at the step.

To address the above, as shown in FIG. 9, the image display surface-side polarizing plate 15 is folded into the gap between the end section of the enclosure 8 of the liquid crystal module and the enclosure 10 of the liquid crystal display device, and the gap is filled up, using sealing resin. This can advantageously improve flatness of the image display surface, and facilitate removal of dirt through wiping.

Note that although the front plate 14 is shown larger than the liquid crystal panel 1 in FIG. 9, the front plate 14 may have the size same as that of the liquid crystal panel 1.

Ninth Embodiment

In the following, a ninth preferred embodiment for rendering the present invention into practice will be described in detail, referring to FIG. 9, similar to the eighth embodiment.

In FIG. 9, when considering the image display surface of the front plate 14 as two separate areas, namely, a display area and a non-display area outside the display area, the display area remains black when the backlight does not light. Thus, basically, the non-display area remains black as well.

When the sealing resin portion is black, the sealing resin portion appears like an extension of the non-display area. This enhances apparent flatness of the entire image display surface, and is preferable in view of design.

Tenth Embodiment

In the following, a tenth preferred embodiment for rendering the present invention into practice will be described in detail, referring to FIG. 10.

Figure 10:
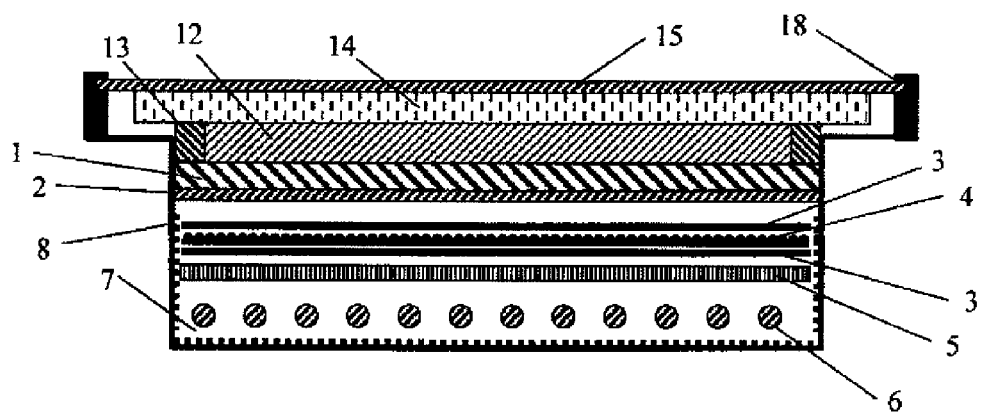
FIG. 10 is a schematic cross sectional view of a liquid crystal panel for use in a liquid crystal display device according to a tenth embodiment.

FIG. 10 is a schematic cross sectional view of a liquid crystal panel 1 for use in a liquid crystal display device according to the tenth embodiment.

In the first to ninth embodiments, the end section of the image display surface-side polarizing plate 15 is protected by sealing. However, the end section can be protected, though not being sealed, from being wet when being wiped with a wet cloth when the end section is protected using a liquid crystal module, or the like.

For example, as shown in FIG. 10, a slit 18 is formed on the enclosure 8 of the liquid crystal module for accepting the polarizing plate 15. With the end section of the image display surface-side polarizing plate 15 inserted into the slit 18, waterproof capacity can be advantageously improved, compared to a case with the end section remaining uncovered.

Note that although the front plate 14 is shown larger than the liquid crystal panel 1 in FIG. 10, the front plate 14 may have the size same as that of the liquid crystal panel 1.

Eleventh Embodiment

In the following, an eleventh preferred embodiment for rendering the present invention into practice will be described in detail, referring to FIGS. 11 and 12.

Figure 11:
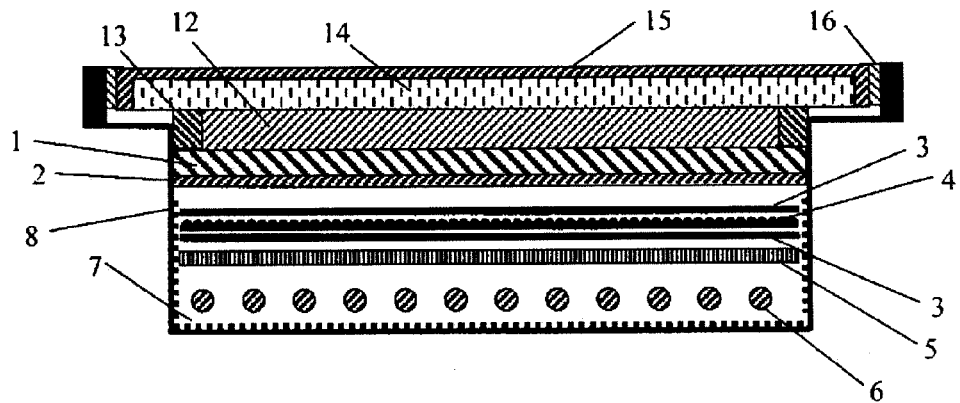
FIG. 11 is a schematic cross sectional view of a liquid crystal panel for use in a liquid crystal display device according to an eleventh embodiment.

FIG. 11 is a schematic cross sectional view of a liquid crystal panel 1 for use in a liquid crystal display device according to the eleventh embodiment.

Figure 12:
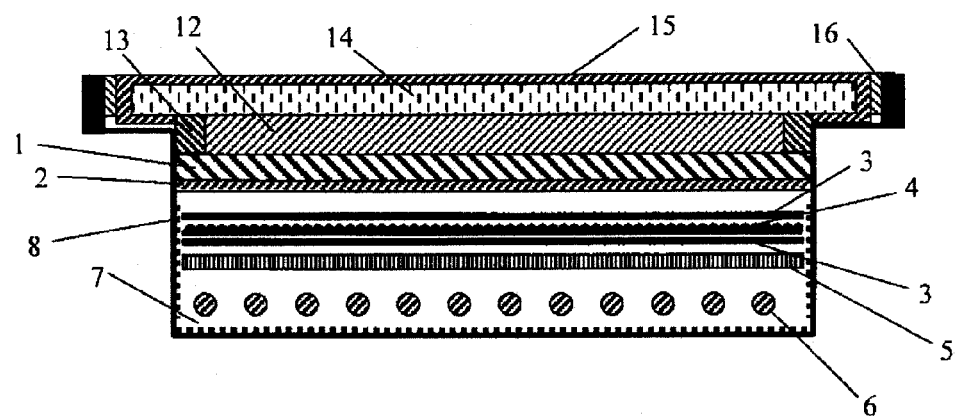
FIG. 12 is a schematic cross sectional view of a liquid crystal panel for use in a liquid crystal display device according to the eleventh embodiment.

FIG. 12 is a schematic cross sectional view of a liquid crystal panel for use in a liquid crystal display device according to the eleventh embodiment.

In order to make waterproof the end section of the image display surface-side polarizing plate 15 without sealing the end section, the end section of the polarizing plate 15 is folded into between the lateral surface of the front plate 14 and the enclosure 8 of the liquid crystal module, and the gap between the image display surface-side polarizing plate 15 and the enclosure 8 of the liquid crystal module is filled up using sealing resin, as shown in FIG. 11. This can improve waterproof capability, compared to the embodiment shown in FIG. 10.

Note that this structure can advantageously prevent water from soaking inside the liquid crystal module.

Further, as the liquid crystal panel 1 having the front plate 14 attached thereon and the enclosure 8 of the liquid crystal module are bound, using sealing resin, strength in adhesion can also be advantageously improved.

Note that although the front plate 14 is shown larger than the liquid crystal panel 1 in FIG. 11, the front plate 14 may have the size same as that of the liquid crystal panel 1.

Further, by folding toward the non-display surface of the front plate 14, as shown in FIG. 12, the end section of the polarizing plate 15 is resultantly placed farther from the surface of the front plate, compared to the structure shown in FIG. 11. This can improve waterproof effect.

Twelfth Embodiment

In the following, a twelfth preferred embodiment for rendering the present invention into practice will be described in detail, referring to FIG. 11, similar to the eleventh embodiment.

In FIG. 11, when considering the image display surface of the front plate 14 as two separate areas, namely, a display area and a non-display area outside the display area, the display area remains black when the backlight does not light. Thus, basically, the non-display area remains black as well.

When the sealing resin portion is black, the sealing resin portion appears like an extension of the non-display area. This enhances apparent flatness of the entire image display surface, and is preferable in view of design.

Thirteenth Embodiment

In the following, a thirteenth preferred embodiment for rendering the present invention into practice will be described in detail, referring to FIGS. 13 and 14.

Figure 13:
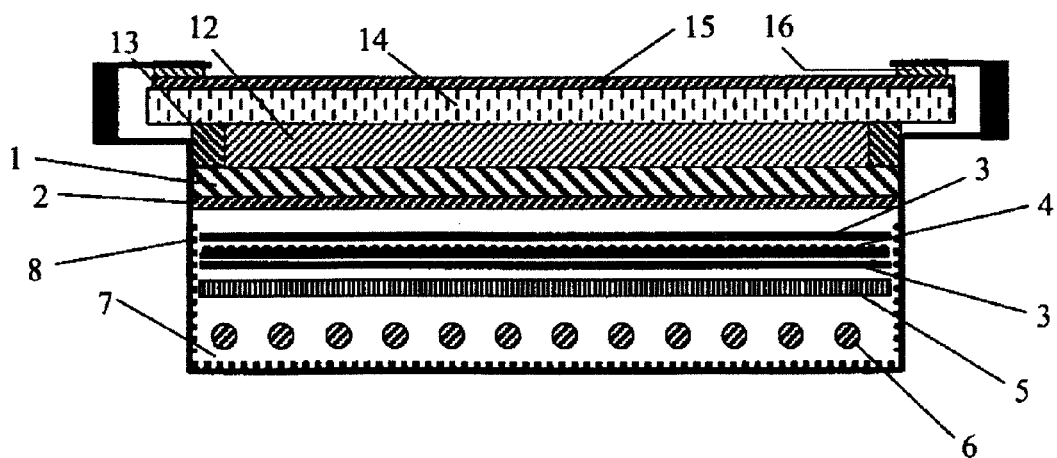
FIG. 13 is a schematic cross sectional view of a liquid crystal panel for use in a liquid crystal display device according to a thirteenth embodiment.

FIG. 13 is a schematic cross sectional view of a liquid crystal panel 1 for use in a liquid crystal display device according to the thirteenth embodiment.

Figure 14:
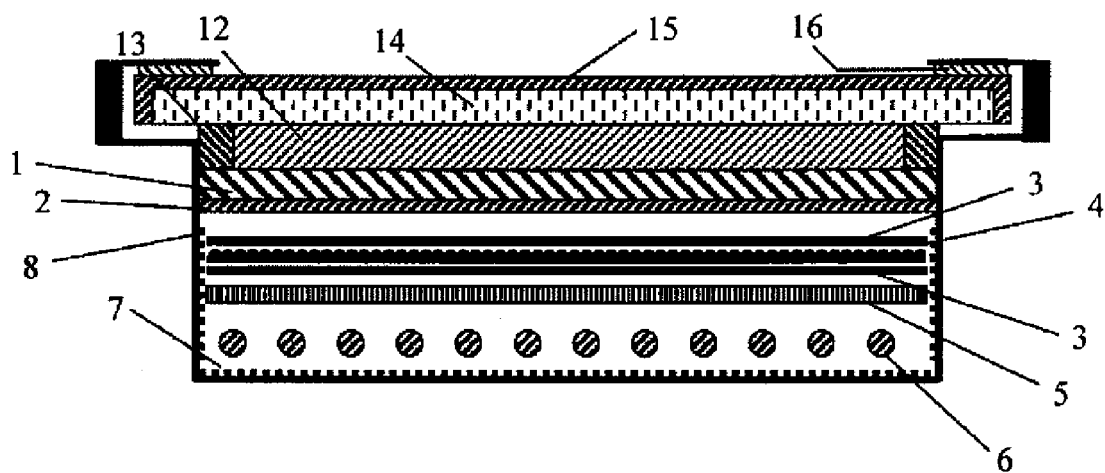
FIG. 14 is a schematic cross sectional view of a liquid crystal panel for use in a liquid crystal display device according to the thirteenth embodiment.

FIG. 14 is a schematic cross sectional view of a liquid crystal panel 1 for use in a liquid crystal display device according to the thirteenth embodiment.

With a structure, as shown in FIG. 13, in which a part of the liquid crystal module overlies the front plate 14 and sealing resin is filled in the gap in the area overlain, adhesion between the liquid crystal panel 1 having the front plate 14 attached thereon and the liquid crystal module is enhanced.

Also, by binding the front plate and the liquid crystal module together via the polarizing plate, using sealing resin, when sealing, as shown in FIG. 13, not only sealing of the end section of the polarizing plate 15, but also binding between the liquid crystal panel 1 having the front plate 14 attached thereon and the liquid crystal module can be achieved at the same time. This can enhance productivity.

Note that as the end section of the image display surface-side polarizing plate 15 is located inner side in the enclosure 8 of the liquid crystal module than the sealed portion, waterproof capacity can be ensured.

Further, as shown in FIG. 14, by bending the image display surface-side polarizing plate 15 along the lateral surface of the front plate 14, the end section of the polarizing plate 15 is resultantly located farther from the surface of the front plate 14, compared to the structure shown in FIG. 13. This can enhance waterproof effect.

Note that although the front plate 14 is shown larger than the liquid crystal panel 1 in FIGS. 13 and 14, the front plate 14 may have the size same as that of the liquid crystal panel 1.

Fourteenth Embodiment

In the following, a fourteenth preferred embodiment for rendering the present invention into practice will be described in detail, referring to FIG. 15.

Figure 15:
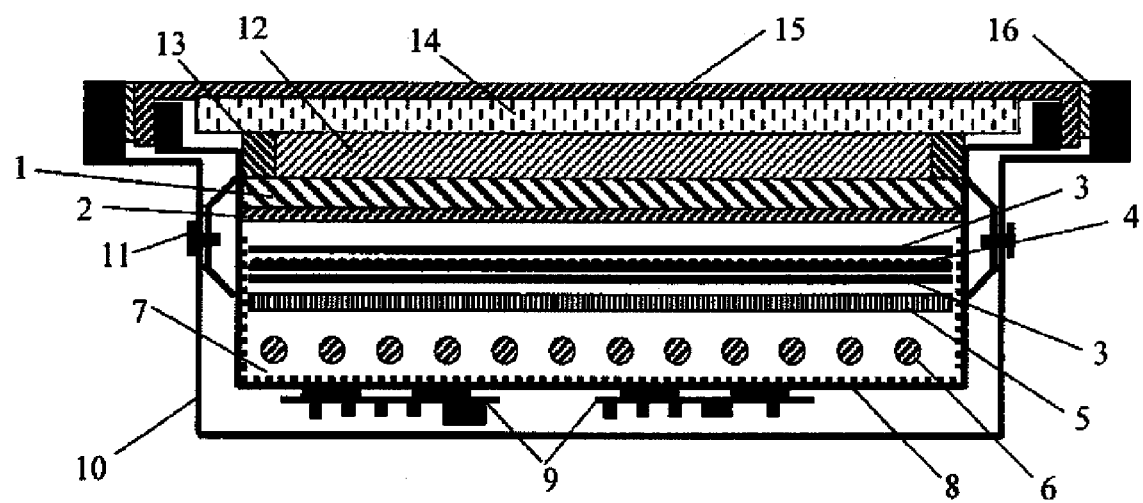
FIG. 15 is a schematic cross sectional view of a liquid crystal display device according to the thirteenth embodiment.

FIG. 15 is a schematic cross sectional view of a liquid crystal display device according to the thirteenth embodiment.

For wiping the image screen with a wet cloth, or the like, not only the display area of the image display surface but also the non-display area is desired to be flat so that the image screen can be wiped smoothly without catching the wet cloth, and dirt on the image screen can be readily removed. If there is a step between the end section of the front plate 14 and the module and between the end section of the module and the image display device, the wet cloth may be caught by the step and dirt may be piled at the step.

To address the above, as shown in FIG. 15, the image display surface-side polarizing plate 15 is folded into the gap between the end section of the enclosure 10 of the liquid crystal display device and the enclosure 8 of the liquid crystal module, and the gap is filled up, using sealing resin. This can advantageously improve flatness of the image display surface, and facilitate removal of dirt through wiping.

Note that although the front plate 14 is shown larger than the liquid crystal panel 1 in FIG. 15, the front plate 14 may have the size same as that of the liquid crystal panel 1.

Fifteenth Embodiment

In the following, a fifteenth preferred embodiment for rendering the present invention into practice will be described in detail, referring to FIG. 15, similar to the fourteenth embodiment.

In FIG. 15, when considering the image display surface of the front plate 14 as two separate areas, namely, a display area and a non-display area outside the display area, the display area remains black when the backlight does not light. Thus, basically, the non-display area remains black as well.

When the sealing resin portion is black, the sealing resin portion appears like an extension of the non-display area. This enhances apparent flatness of the entire image display surface, and is preferable in view of design.

Sixteenth Embodiment

In the following, a sixteenth preferred embodiment for rendering the present invention into practice will be described in detail.

In bright environment, ambient scenery is reflected on the image display surface, and therefore visibility is deteriorated. To address the above, concaves and concaves, or the like, are formed on the forefront surface of the image display surface-side polarizing plate or an anti-glare layer containing fine particles is attached to the surface of the polarizing plate to thereby reduce the reflection.

Further, provision of an anti-reflecting layer made of material having a low refractive index can also reduce the reflection. Thus, provision of an anti-glare layer or an anti-reflecting layer can advantageously suppress reflection of ambient scenery even in bright environment, and improves visibility.

Seventeenth Embodiment

In the following, a seventeenth preferred embodiment for rendering the present invention into practice will be described in detail.

The polarizing plate originally has a function for passing only polarized light in a constant direction. However, in the case where material having high retardation is present between the image display surface-side polarizing plate 15 and the backlight-side polarizing plate 2, a phenomenon may be caused in which light other than the light in the constant direction leaks from the polarizing plate 15.

Here, it is the liquid crystal panel 1, the transparent organic medium layer 12, and the front plate 14, which are present between the two polarizing plates 2, 15.

While the liquid crystal panel 1 is originally made of material having very small difference of double refraction, it is likely that the transparent organic medium layer 12 and the front plate 14 increase the difference of double refraction.

In view of the above, a tolerable degree of retardation of these members is determined.

Conclusively, it is determined that increase of brightness when displaying black is of 2.5%, 3.5%, 4.5% when a difference of double refraction is of 5 nm, 8 nm, 10 nm, respectively.

This extent of increase of brightness is rarely recognizable for human eyes. However, it is determined, based on the fact that increase of a difference of double refraction of 12 nm, 16 nm, 20 nm leads to increase of 7.5%, 11%, 15%, respectively, of brightness of an image when displaying black, that increase of a difference of double refraction in excess of 10 nm results in significant increase of brightness, which leads to bluish black displayed.

Based on the above, it is determined that the total difference of double refraction of the transparent organic medium layer 12 and the front plate 14, being of 10 nm or less is tolerable for an image display device.

What is claimed is:

1. A liquid crystal display device, comprising:
    a liquid crystal display module including a backlight unit and a liquid crystal panel;
    a first polarizing plate attached to a side of the liquid crystal panel, the side facing the backlight unit;
    a transparent front plate mounted on a side of the liquid crystal panel, the side not facing the backlight unit;
    a transparent organic medium layer placed between the front plate and the liquid crystal panel; and
    a second polarizing plate attached to a surface of the front plate, the surface being a surface opposite from a surface thereof closer to the transparent organic medium layer, wherein
    an end section of the second polarizing plate is sealed using resin so as not to be directly exposed to air.

2. The liquid crystal display device according to claim 1, wherein the end section of the second polarizing plate is folded into inside the liquid crystal module along a surface of the front plate.

3. The liquid crystal display device according to claim 1, wherein
    the end section of the second polarizing plate is folded into inside the liquid crystal module along a surface of the front plate, and
    the front plate, an enclosure of the liquid crystal module, and the end section of the second polarizing plate are commonly sealed and bound, using the resin.

4. The liquid crystal display device according to claim 1, wherein the resin is black.

5. The liquid crystal display device according to claim 1, wherein
    a part of an enclosure of the liquid crystal module overlies a part of the front plate, and
    the front plate, an enclosure of the liquid crystal module, and the end section of the second polarizing plate are commonly sealed and bound, using the resin.

6. The liquid crystal display device according to claim 5, wherein the resin is black.

7. The liquid crystal display device according to claim 1, wherein
    a part of an enclosure of the liquid crystal module overlies a part of the front plate,
    the front plate, the enclosure of the liquid crystal module, and the end section of the second polarizing plate are commonly sealed and bound, using the resin, and
    the second polarizing plate is smaller than the front plate.

8. The liquid crystal display device according to claim 1, wherein an enclosure of the liquid crystal display device, an enclosure of the liquid crystal module, and the end section of the second polarizing plate are commonly sealed and bound, using the resin.

9. The liquid crystal display device according to claim 8, wherein the resin is black.

10. A liquid crystal display device, comprising:
    a liquid crystal display module including a backlight unit and a liquid crystal panel;
    a first polarizing plate attached to a side of the liquid crystal panel, the side facing the backlight unit;
    a transparent front plate mounted on a side of the liquid crystal panel, the side not facing the backlight unit;
    a transparent organic medium layer placed between the front plate and the liquid crystal panel; and
    a second polarizing plate attached to a surface of the front plate, the surface being a surface opposite from a surface thereof closer to the transparent organic medium layer, wherein
    an end section of the second polarizing plate is inserted from an end section of the front plate into inside the liquid crystal display module.

11. The liquid crystal display device according to claim 10, wherein
    the end section of the second polarizing plate is folded along a surface of the front plate into inside the liquid crystal module, and
    a portion of the second polarizing plate along a surface of the front plate and an enclosure of the liquid crystal module are sealed and bound, using common resin.

12. The liquid crystal display device according to claim 11, wherein the common resin for sealing and bounding is black.

13. The liquid crystal display device according to claim 10, wherein
    a part of an enclosure of the liquid crystal module overlies a part of the front plate, and
    the part of the enclosure of the liquid crystal module, which overlies the part of the front plate, and a part of the second polarizing plate are sealed and bound, using common resin.

14. The liquid crystal display device according to claim 10, wherein an enclosure of the liquid crystal display device, an enclosure of the liquid crystal module, and a part of the second polarizing plate which is folded into inside the liquid crystal module are sealed and bound, using common resin.

15. The liquid crystal display device according to claim 14, wherein the common resin for sealing and bounding is black.

16. The liquid crystal display device according to claim 1, wherein the second polarizing plate further has an anti-glare layer or an anti-reflecting layer attached to a surface thereof not in contact with the front plate.

17. The liquid crystal display device according to claim 1, wherein a difference of double refraction of the front plate and the transparent organic medium layer is of 10 nm or less.

* * * * *